(12) United States Patent
Spiller et al.

(10) Patent No.: US 9,554,617 B2
(45) Date of Patent: *Jan. 31, 2017

(54) PROTECTION DEVICES FOR USE IN SHOES OR OTHER PRODUCTS

(71) Applicant: TBL Licensing LLC, Wilmington, DE (US)

(72) Inventors: Bert Appleton Spiller, Dover, NH (US); Denis W. Norton, Plymouth, MN (US); Stephen D. Ammon, Merrimac, MA (US)

(73) Assignee: TBL Licensing LLC, Stratham, NH (US)

( * ) Notice: Subject to any disclaimer, the term of this patent is extended or adjusted under 35 U.S.C. 154(b) by 344 days.

This patent is subject to a terminal disclaimer.

(21) Appl. No.: 14/161,956

(22) Filed: Jan. 23, 2014

(65) Prior Publication Data

US 2014/0130371 A1    May 15, 2014

Related U.S. Application Data

(63) Continuation of application No. 13/648,839, filed on Oct. 10, 2012, now Pat. No. 8,635,789.

(Continued)

(51) Int. Cl.
*A43B 7/32* (2006.01)
*A43B 7/00* (2006.01)
(Continued)

(52) U.S. Cl.
CPC .............. *A43B 7/32* (2013.01); *A43B 1/0009* (2013.01); *A43B 3/0078* (2013.01); *A43B 7/00* (2013.01);
(Continued)

(58) Field of Classification Search
CPC ........... A43B 1/0009; A43B 7/06; A43B 7/08; A43B 7/32
(Continued)

(56) References Cited

U.S. PATENT DOCUMENTS 2,869,253 A     1/1959   Sachs
RE24,897 E     11/1960   Schlecht
(Continued)

FOREIGN PATENT DOCUMENTS

JP     2006042869 A    2/2006
WO        0064292 A1  11/2000
(Continued)

OTHER PUBLICATIONS

International Search Report and Written Opinion for Application No. PCT/US2012/059562 dated Mar. 20, 2013.

*Primary Examiner* — Marie Bays
(74) *Attorney, Agent, or Firm* — Lerner, David, Littenberg, Krumholz & Mentlik, LLP

(57) ABSTRACT

A variety of devices for protecting a user's foot from injury are disclosed. In one embodiment, the device may be a metatarsal protection device, which may include a first layer of material having top and bottom surfaces, with at least one of such surfaces including a series of cones or a pattern of hexagons thereon. The metatarsal protection device may also include a second relatively rigid layer of material overlying the first layer, and the first layer may be shaped to conform to the metatarsal region of the user's foot, such that the device is configured to protect the metatarsal region against injury. Other configurations and variations of a metatarsal protection device are also disclosed, as are other uses for the principles of the invention(s) disclosed herein (e.g., protection devices for other areas of the foot, etc).

23 Claims, 10 Drawing Sheets

Related U.S. Application Data

(60) Provisional application No. 61/664,217, filed on Jun. 26, 2012, provisional application No. 61/545,317, filed on Oct. 10, 2011.

(51) Int. Cl.
*A43B 1/00* (2006.01)
*A43B 3/00* (2006.01)
*A43B 7/14* (2006.01)
*A43B 9/04* (2006.01)
*A43B 13/18* (2006.01)
*A43B 23/02* (2006.01)
*A43B 23/22* (2006.01)
*B29D 35/00* (2010.01)
*B29D 35/14* (2010.01)

(52) U.S. Cl.
CPC ............. *A43B 7/144* (2013.01); *A43B 7/1445* (2013.01); *A43B 9/04* (2013.01); *A43B 13/181* (2013.01); *A43B 13/187* (2013.01); *A43B 23/028* (2013.01); *A43B 23/22* (2013.01); *B29D 35/0009* (2013.01); *B29D 35/142* (2013.01)

(58) Field of Classification Search
USPC ............. 36/71, 133, 72 R, 54, 3 R, 3 A, 3 B
See application file for complete search history.

(56) References Cited

U.S. PATENT DOCUMENTS

| | | | |
|---|---|---|---|
| 3,693,270 A | 9/1972 | Murray | |
| 4,333,248 A | 6/1982 | Samuels | |
| 4,535,553 A | 8/1985 | Derderian et al. | |
| 4,673,605 A | 6/1987 | Sias et al. | |
| 5,224,277 A | 7/1993 | Sang Do | |
| 5,392,533 A * | 2/1995 | Gerhartl | A43B 17/14 |
| | | | 12/142 R |
| 5,528,841 A | 6/1996 | Pozzobon | |
| 5,680,657 A * | 10/1997 | Valtakari | A41D 13/0156 |
| | | | 2/455 |
| 5,782,014 A | 7/1998 | Peterson | |
| 5,915,819 A | 6/1999 | Gooding | |
| 6,012,236 A * | 1/2000 | Pozzobon | A43B 5/0405 |
| | | | 36/3 A |
| 6,038,790 A | 3/2000 | Pyle et al. | |
| 6,138,383 A * | 10/2000 | Steinke | A43B 7/1425 |
| | | | 36/141 |
| 6,381,876 B2 * | 5/2002 | Krajcir | A43B 7/32 |
| | | | 36/72 R |
| 6,497,057 B1 | 12/2002 | Lee et al. | |
| 6,581,305 B2 | 6/2003 | Ho | |
| 6,752,450 B2 | 6/2004 | Carroll, III et al. | |
| 6,754,982 B2 | 6/2004 | Reed et al. | |
| 6,802,138 B2 | 10/2004 | McManus et al. | |
| 6,926,947 B1 | 8/2005 | Seckel | |
| 6,939,599 B2 | 9/2005 | Clark | |
| 7,134,223 B2 | 11/2006 | Ganon | |
| 7,475,497 B2 * | 1/2009 | Hoffer | A43B 1/0009 |
| | | | 36/28 |
| RE40,757 E | 6/2009 | Covatch | |
| 7,774,954 B2 * | 8/2010 | Hoffer | A43B 1/0009 |
| | | | 36/28 |
| RE43,214 E | 2/2012 | Covatch | |
| 8,161,665 B2 * | 4/2012 | Nakano | A43B 19/00 |
| | | | 36/55 |
| 8,635,789 B2 * | 1/2014 | Spiller | A43B 7/00 |
| | | | 36/71 |
| 8,661,712 B2 * | 3/2014 | Aveni | A43B 23/0215 |
| | | | 36/3 A |
| 2001/0022039 A1 * | 9/2001 | Krajcir | A43B 7/32 |
| | | | 36/72 R |
| 2002/0017038 A1 | 2/2002 | Umezawa | |
| 2003/0097768 A1 | 5/2003 | Baek | |
| 2003/0101620 A1 | 6/2003 | Reed et al. | |
| 2003/0150131 A1 | 8/2003 | McManus et al. | |
| 2009/0100722 A1 * | 4/2009 | Hoffer | A43B 1/0009 |
| | | | 36/3 R |
| 2009/0276943 A1 * | 11/2009 | Balolia | A41D 13/05 |
| | | | 2/455 |
| 2010/0275470 A1 * | 11/2010 | Hoffer | A43B 1/0009 |
| | | | 36/3 R |
| 2010/0299967 A1 | 12/2010 | Atsumi et al. | |
| 2011/0185597 A1 | 8/2011 | Guest | |
| 2011/0247240 A1 | 10/2011 | Eder et al. | |
| 2012/0317836 A1 | 12/2012 | Voorhees | |

FOREIGN PATENT DOCUMENTS

| | | |
|---|---|---|
| WO | 2006017651 A1 | 2/2006 |
| WO | 2011050373 A1 | 4/2011 |

* cited by examiner

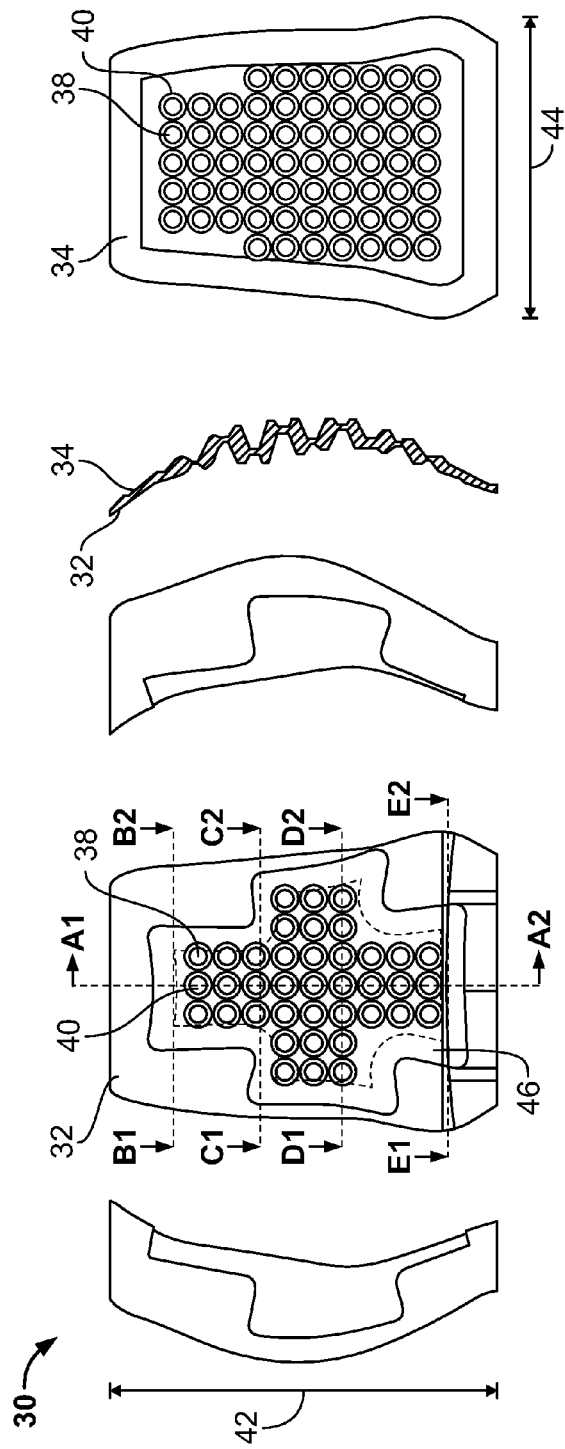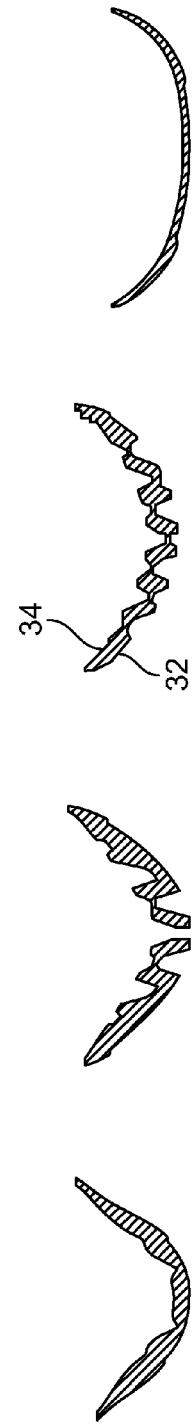

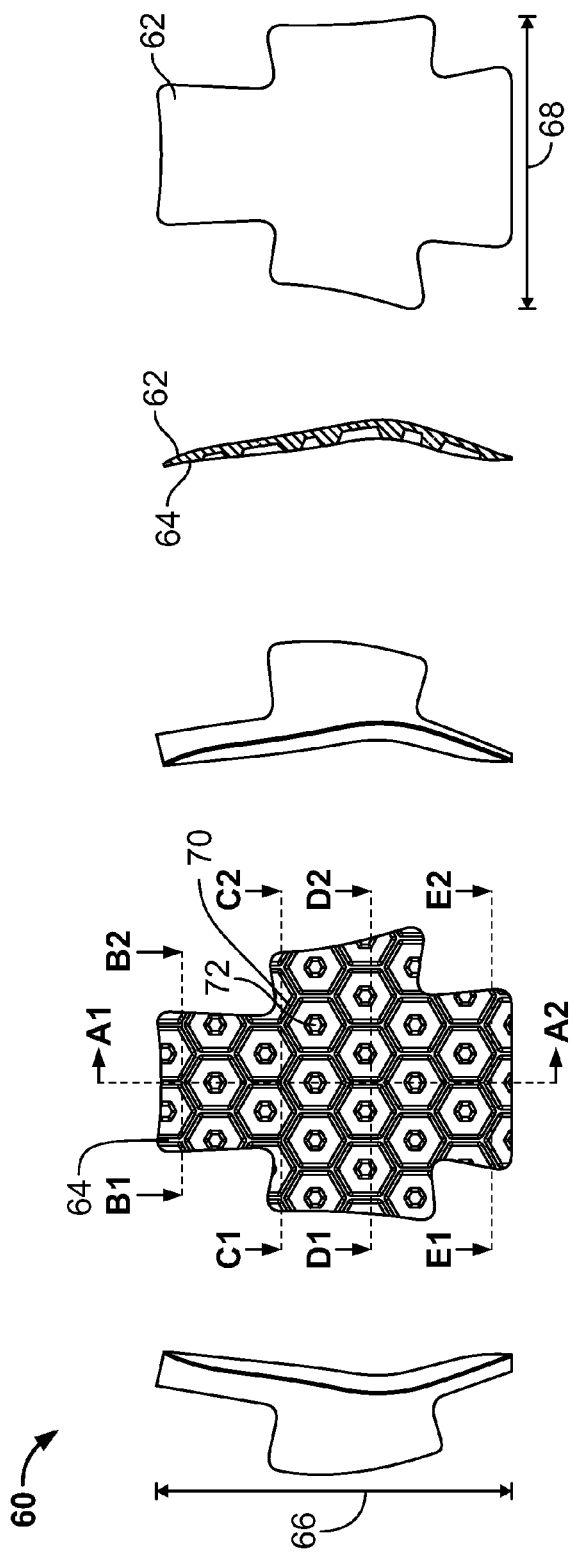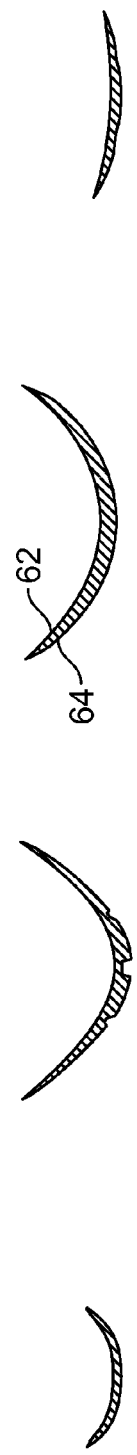

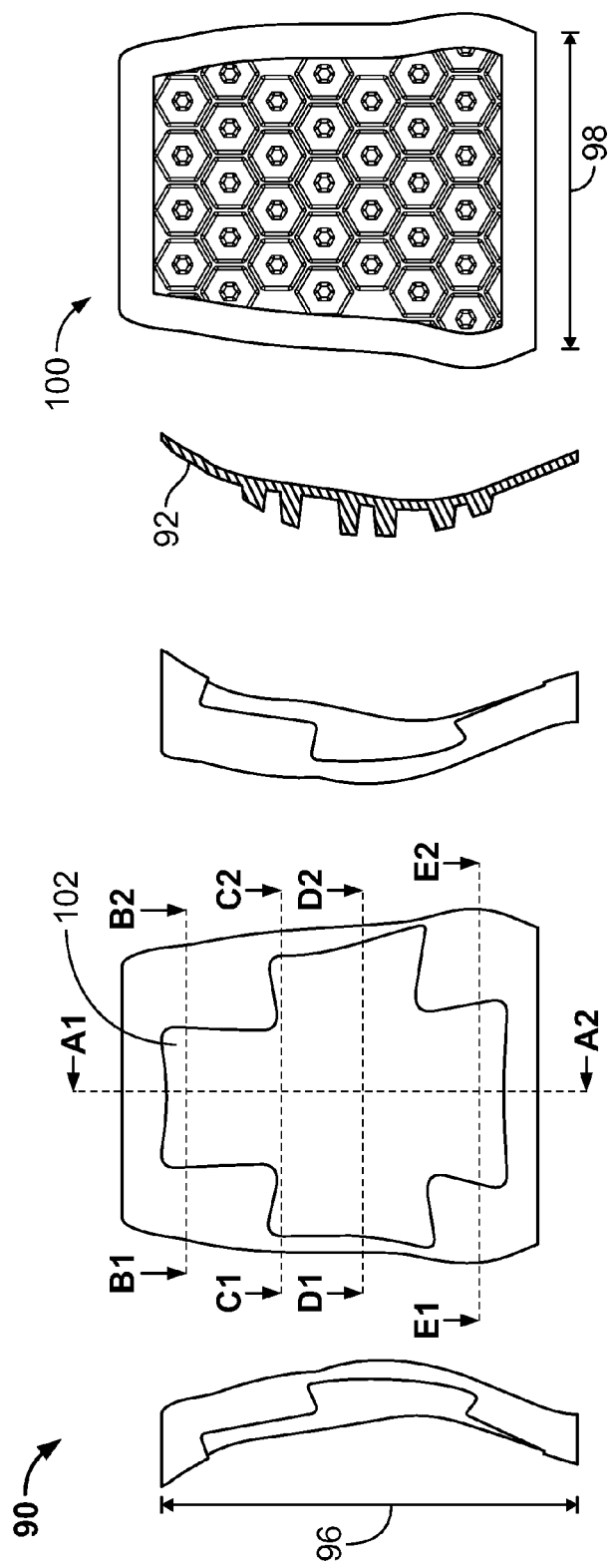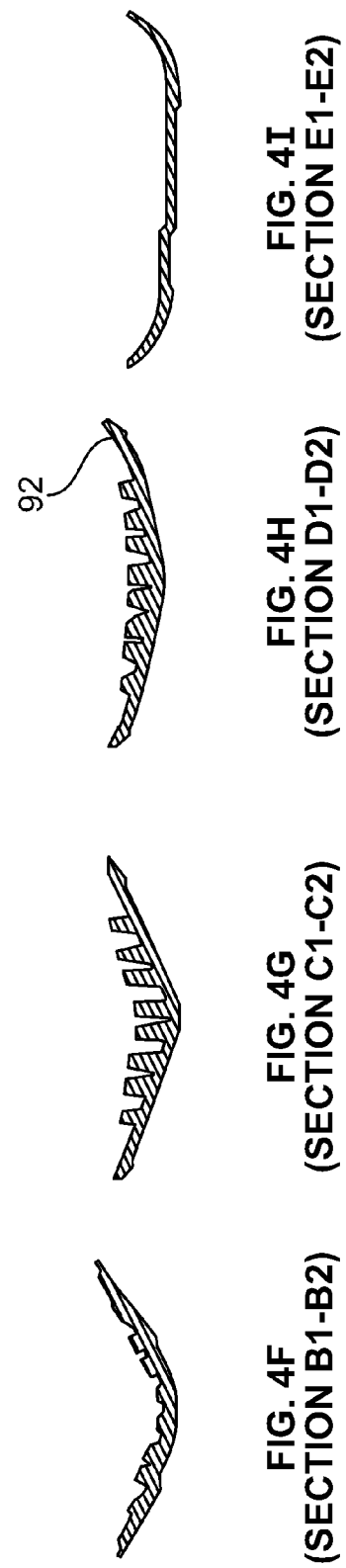

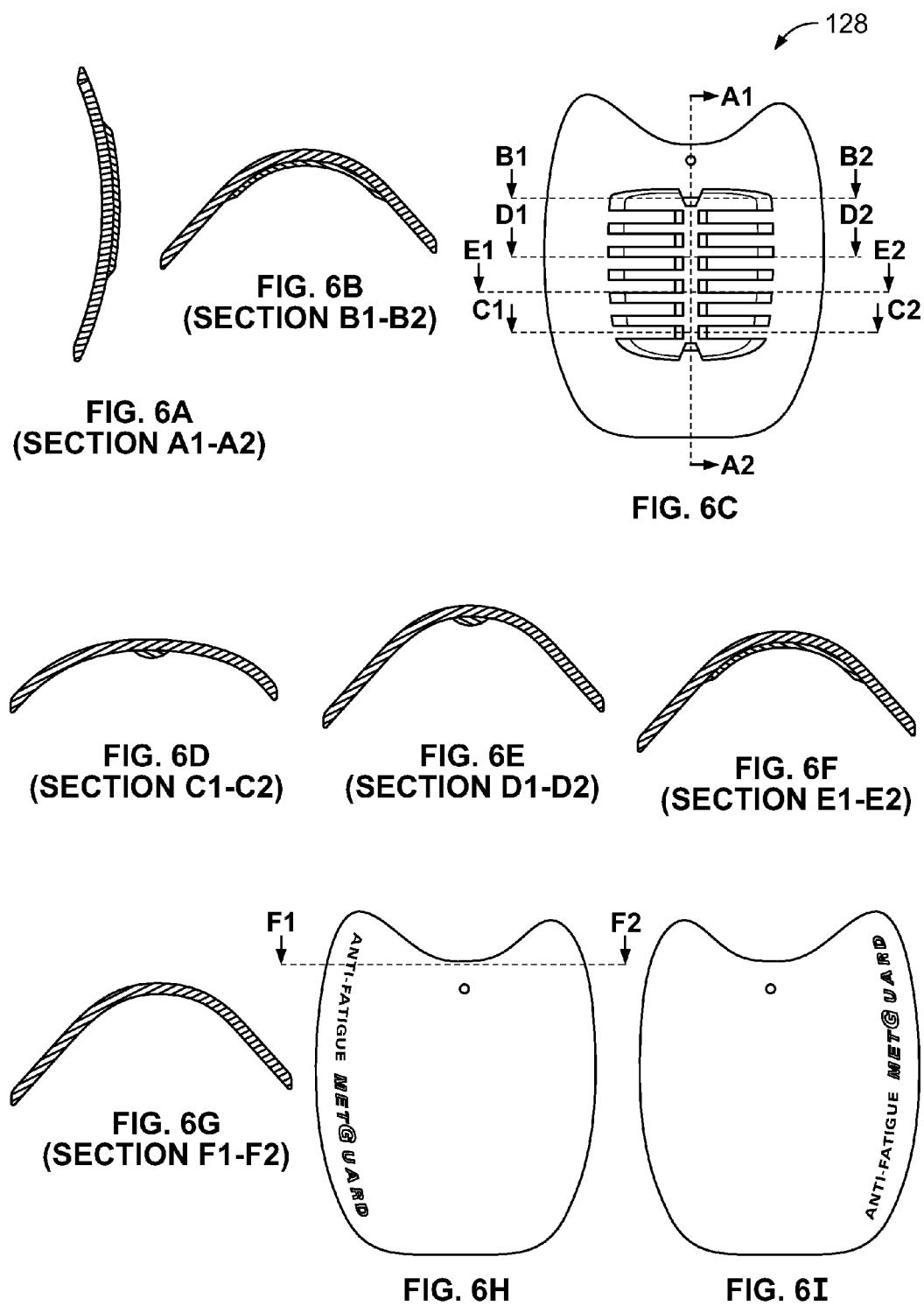

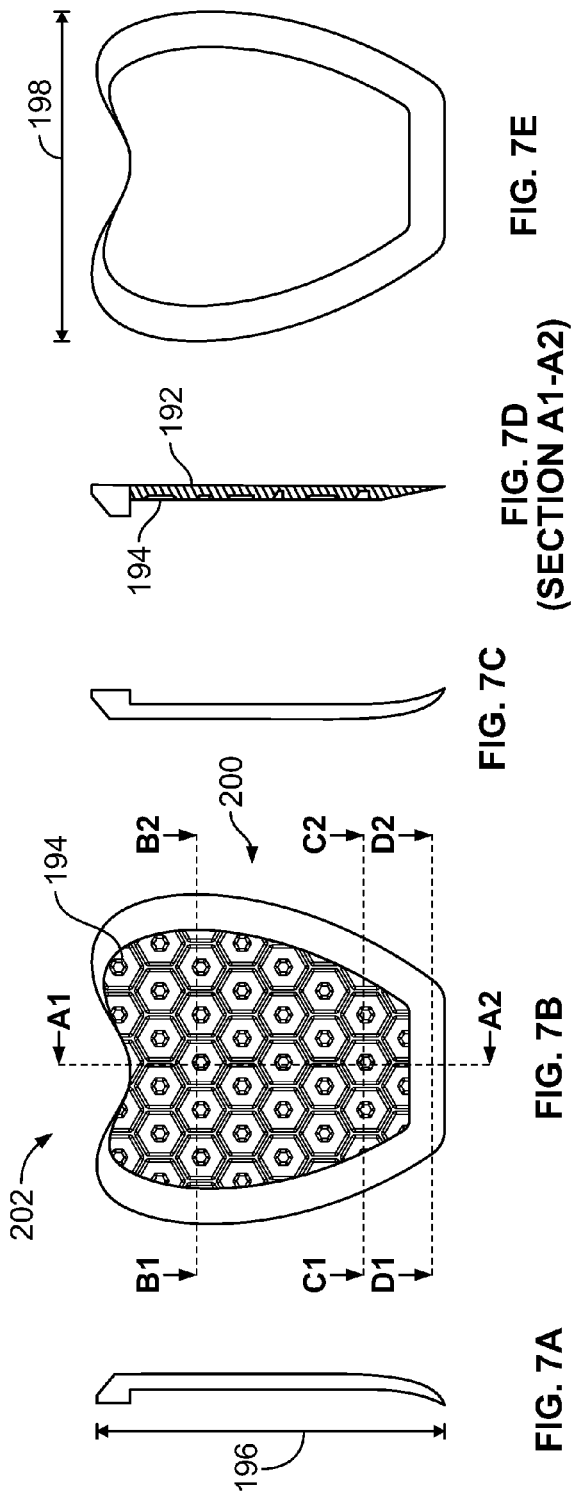

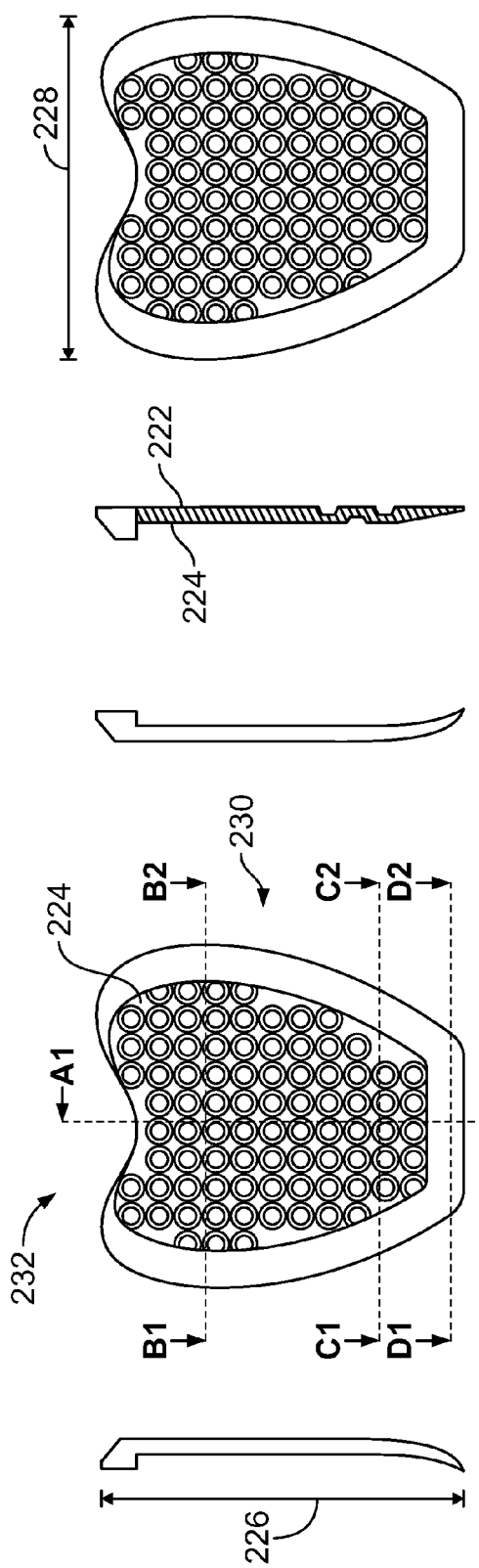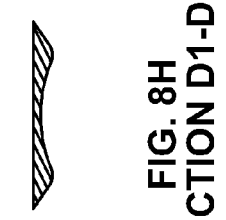

PROTECTION DEVICES FOR USE IN SHOES OR OTHER PRODUCTS

CROSS-REFERENCE TO RELATED APPLICATIONS

This application is a continuation of U.S. application Ser. No. 13/648,839, filed on Oct. 10, 2012, which application claims the benefit of U.S. Provisional Patent Application Nos. 61/545,317 and 61/664,217, filed, respectively, on Oct. 10, 2011 and Jun. 26, 2012, the disclosures of which are hereby incorporated herein by reference.

BACKGROUND OF THE INVENTION

Aspects of the present invention relate, in general, to protection devices for use in shoes, and specifically to metatarsal or other protection devices for shielding a user's foot from injury. Protection devices for use in shielding other areas of a user's foot, other portions of the body, or in alternate applications beyond bodily protection are also contemplated.

Protection devices for shielding the metatarsal area of the foot from injury are widely used in various sectors of the footwear industry. Typically, these protection devices are referred to as metatarsal guards, and may be employed as an external guard or integrated into the shoe itself (e.g., an internal guard). Common scenarios in which such metatarsal guards may be necessary are in construction applications, in mining, or in other like fields where the foot may be susceptible to injury due to impact with extraneous objects (e.g., falling rocks, lumber, puncture via nails, etc.) In some cases, while the aforementioned metatarsal guard(s) may provide adequate protection from injury, such guard(s) may restrict comfortable movement of the foot due to the rigidity of the guard(s). Other deficiencies not noted here also exist.

Beyond protection of the metatarsal area of the foot, other sensitive areas that are susceptible to injury may also require shielding. For example, it may be the case that the foot, in certain scenarios, requires side or heel protection instead of, or in combination with, metatarsal protection. It is not uncommon to provide such protective devices on the side or heel region of a shoe in order to provide shielding. Even these protective mechanisms, however, may suffer from several defects, and therefore lack of comfort in use. For example, some heel (or other) protective devices are unnecessarily rigid, and thereby do not adequately absorb the shock resulting from an impact or other injuring event. Stated differently, since such protective devices are unduly rigid, force generated from an impact can travel through the device and be translated to the user, resulting in injury to the user from the impact. Such rigidity also decreases comfort, and sometimes results in the protective device being overly heavy. This may also be the case for several of the metatarsal protection devices noted above.

BRIEF SUMMARY OF THE INVENTION

A first embodiment of the present invention includes a shoe containing an upper having top and bottom layers of material or a flap having an internal pocket, and a device for protecting the metatarsal region of a user's foot, the device being situated between the top and bottom layers of the upper or within the internal pocket. The device may comprise a first layer of material having top and bottom surfaces and a series of cones formed into at least one of the top and bottom surfaces, the series of cones including individual cones of varying depth and width, and a second layer of material overlying the first layer and having a rigidity that is higher than a rigidity of the first layer, the first layer being shaped to conform to the metatarsal region of the user's foot, such that the device is configured to provide protection for the metatarsal region against injurious events.

Other aspects of the first embodiment may include first and second series of cones being formed into the top and bottom surfaces of the first layer of material, respectively, the first and second series including a first set of cones having a first depth and width, and a second set of cones having a second depth and width, the first depth and width being greater than the second depth and width. In some cases, individual cones within the first set may also alternate with individual cones within the second set on both the top and bottom surfaces of the first layer of material. It is also contemplated that the first series of cones may be offset with respect to the second series of cones, such that a terminal end of at least one cone within the first series is situated adjacent a terminal end of at least one cone within the second series.

In addition, in other embodiments, the series of cones formed into the device may be situated on the bottom surface of the first layer of material, and the top surface of the first layer of material may not include a series of cones.

Further aspects of the first embodiment may include a second layer that is situated within a recess formed in the top surface of the first layer, the second layer including a pattern of hexagons. The pattern of hexagons may contain a first set of outer hexagons extending from an outer surface of the second layer, such outer hexagons being defined by a perimeter, and a second set of inner hexagons situated within the perimeter and extending towards the outer surface of the second layer. The outer hexagons comprising the first set may also contain walls defining each hexagon, such walls being angled in one direction, and the inner hexagons comprising the second set may contain walls defining each hexagon, such walls being angled in another direction. The inner surface of the second layer may also be convex in a longitudinal direction and concave in a medial-lateral direction.

Still other aspects of the first embodiment may include a second layer that is adhered to the top surface of the first layer, the second layer including inner and outer surfaces that are generally non-patterned. The second layer, in some instances, may also exhibit rigidity when bent in one direction, and react with relative flexibility when bent in another opposing direction.

A second embodiment of the invention may include a shoe having an upper with top and bottom layers of material or a flap having an internal pocket, and a device for protecting the metatarsal region of a user's foot, the device being situated between the top and bottom layers of the upper or within the internal pocket. The device, in this embodiment, may comprise a first layer of material having top and bottom surfaces, at least one of the top and bottom surfaces including a first pattern of hexagons formed thereon, and a second layer of material overlying the first layer and having a rigidity that is greater than a rigidity of the first layer, the first layer being shaped to conform to the metatarsal region of the user's foot, such that the device is configured to provide protection for the metatarsal region against injurious events.

The first pattern of hexagons, in some aspects of the second embodiment, may include a first set of outer hexagons extending from the bottom surface of the first layer of material, such outer hexagons being defined by a perimeter, and a second set of inner hexagons situated within the perimeter and extending towards the bottom surface of the first layer. The outer hexagons comprising the first set may also include walls defining each hexagon, such walls being angled in one direction, and the inner hexagons comprising the second set may include walls defining each hexagon, such walls being angled in another direction. The bottom surface of the first layer of material may also be convex in a longitudinal direction and concave in a medial-lateral direction.

In some aspects of the second embodiment, the second layer may be situated within a recess formed in the top surface of the first layer, the second layer including a second pattern of hexagons. The second pattern of hexagons may also include a first set of outer hexagons extending from an outer surface of the second layer, such outer hexagons being defined by a perimeter, and a second set of inner hexagons situated within the perimeter and extending towards the outer surface of the second layer.

Still other aspects of the second embodiment may include the second layer being adhered to the top surface of the first layer, the second layer including inner and outer surfaces that are generally non-patterned. The second layer may also exhibit rigidity when bent in one direction, and react with relative flexibility when bent in another opposing direction. The first pattern of hexagons may also be formed only on the bottom surface of the first layer of material.

In other aspects of either the first or second embodiment, the device may be integrally attached to the upper or the flap, or the device may be separable from the upper or the flap.

BRIEF DESCRIPTION OF THE DRAWINGS

A more complete appreciation of the subject matter of the present invention and of the various advantages thereof can be realized by reference to the following detailed description in which reference is made to the accompanying drawings in which:

FIGS. 4A-I include top, bottom, medial, lateral, and section views of an alternate internal metatarsal guard according to another embodiment of the present invention.

FIGS. 6A-I include top, bottom, and section views of a rigid layer forming part of the external metatarsal guard employed in the shoe of FIG. 5.

FIGS. 7A-H include top, bottom, medial, lateral, and section views of one portion of an external metatarsal guard according to an embodiment of the present invention.

FIGS. 8A-H include top, bottom, medial, lateral, and section views of one portion of an alternate external metatarsal guard according to another embodiment of the present invention.

DETAILED DESCRIPTION

In describing aspects of the present invention(s), specific terminology will be used for the sake of clarity. However, the invention(s) is not intended to be limited to any specific terms used herein, and it is to be understood that each specific term includes all technical equivalents, which operate in a similar manner to accomplish a similar purpose.

Figure 1:
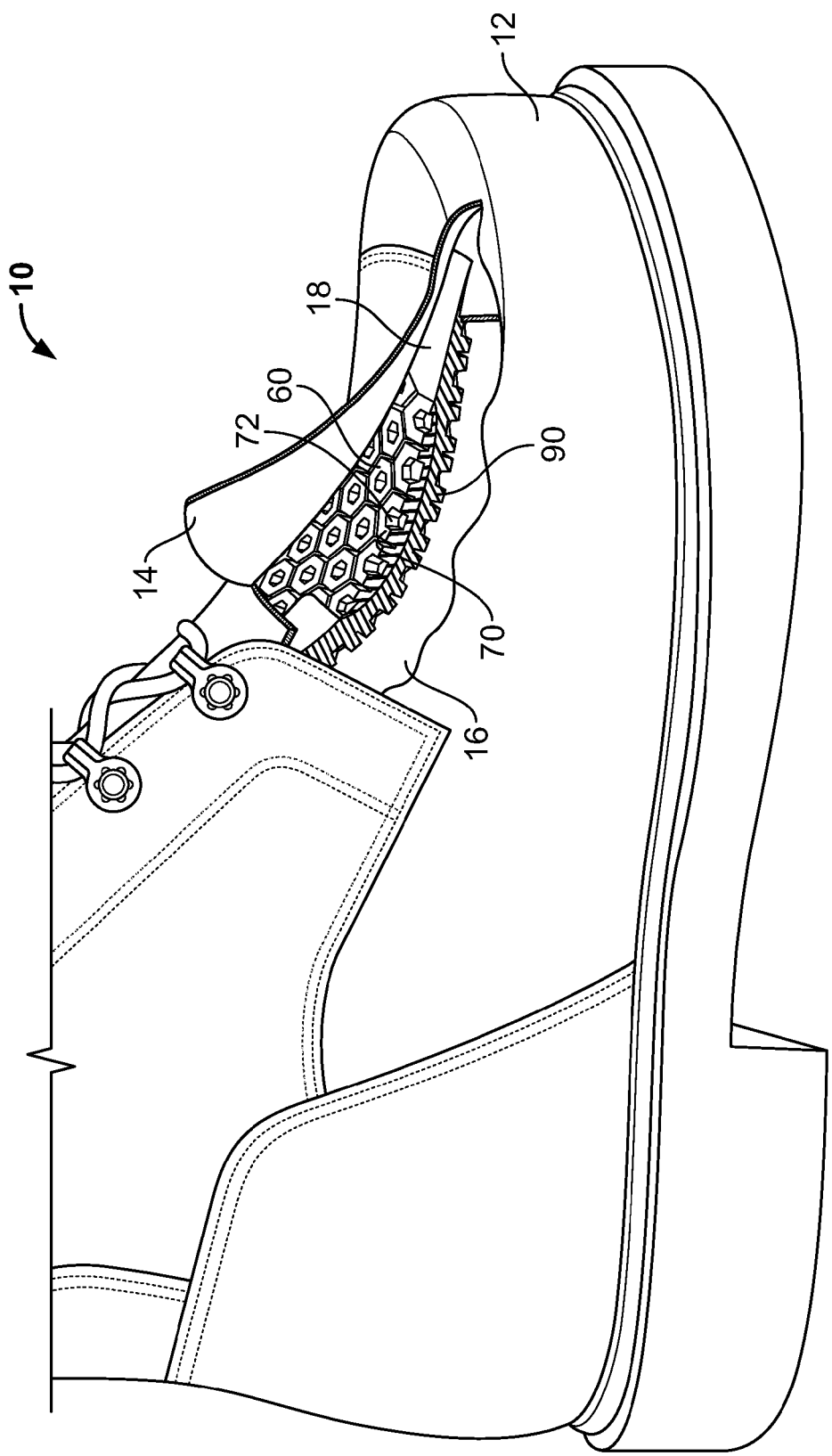
FIG. 1 is a side view of a shoe incorporating therein an internal metatarsal guard according to one embodiment of the present invention.
Figure 2J:
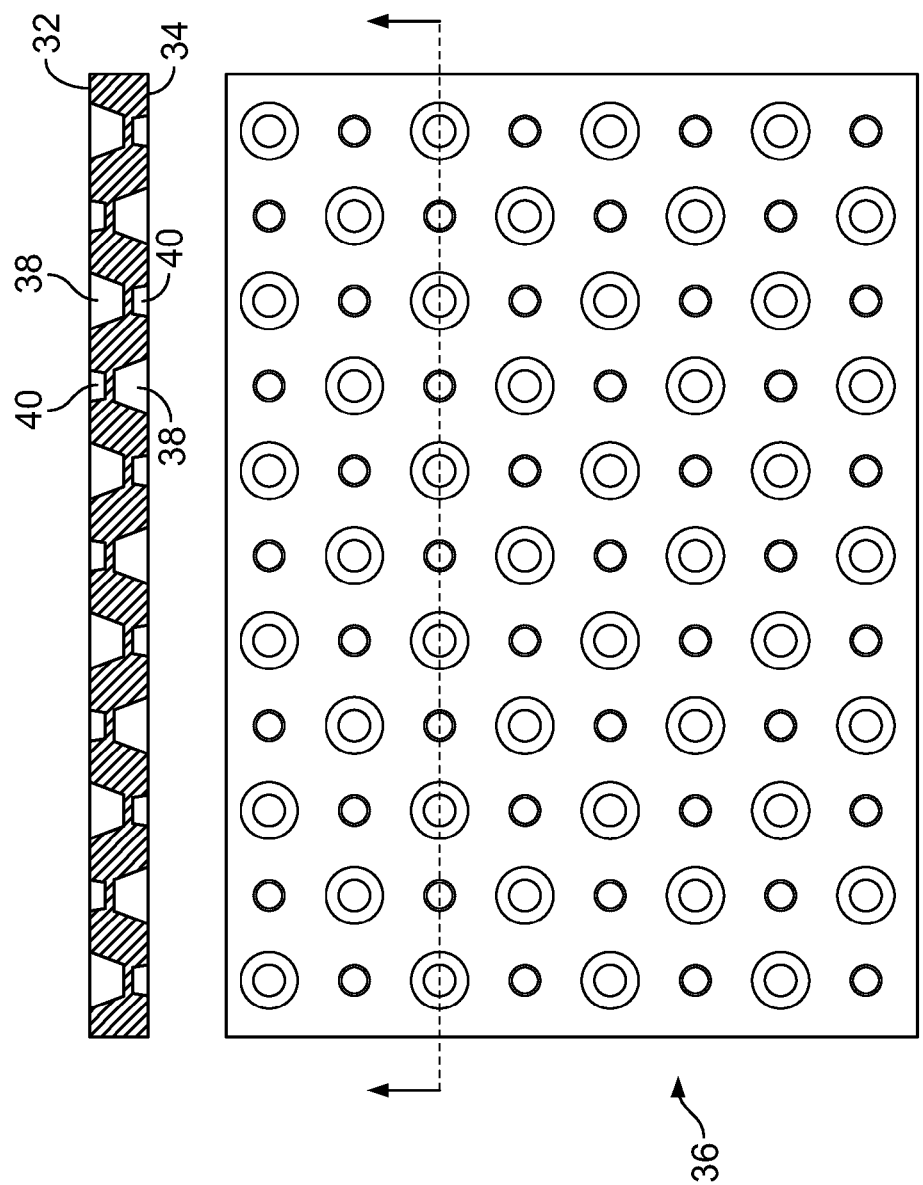
FIGS. 2A-I include top, bottom, medial, lateral, and section views of an internal metatarsal guard according to another embodiment of the present invention, with FIG. 2J showing the pattern of cones formed on the internal guard of FIGS. 2A-I.

FIG. 1 depicts a shoe 10 having an internal metatarsal guard 18 according to one embodiment of the invention, such guard being situated between outer 14 and inner layers 16 of an upper 12 of the shoe 10. FIG. 1, at this point, serves to merely demonstrate where the various metatarsal guards detailed hereafter may be positioned in a shoe. The detailed structure of each such metatarsal guard is as follows.

Referring to FIGS. 2A-I, an internal metatarsal guard 30 according to one embodiment of the present invention is shown, in which the guard 30 is adapted to provide improved flexibility while maintaining adequate protection for the metatarsal region of a user's foot. As with guard 18 discussed above, internal metatarsal guard 30 may be situated between outer and inner layers of an upper of a shoe (e.g., shoe 10 shown in FIG. 1) to provide protection for the foot.

In one embodiment, guard 30 may include a top surface 32 and a bottom surface 34, each surface 32, 34 having a pattern of individual cones 36 formed thereon. For example, as shown in FIGS. 2A-I, and particularly FIG. 2J, top surface 32 of metatarsal guard 30 may have a plurality of cones of one size 38 formed therein, and a plurality of cones of a relatively smaller size 40 extending into surface 32. Such cones 38, 40 may also alternate with one another in both a longitudinal direction 42 and a medial-lateral 44 direction. Likewise, a similar pattern of large 38 and relatively smaller cones 40 may be situated on bottom surface 34 of metatarsal guard 30, although the pattern 36 on bottom surface 34 may be offset from the pattern 36 on top surface 32. Stated differently, a substantially identical pattern 36 of cones 38, 40 may be situated on bottom surface 34; however, the pattern 36 on bottom surface 34 may be arranged such that a large cone 38 on surface 34 may be disposed directly opposite a small cone 40 on top surface 32, and vice versa. This is shown best in FIGS. 2D, 2G-H, and particularly FIG. 2J. It is also contemplated that the pattern(s) 36 of cones 38, 40 on top 32 and bottom 34 surfaces may, instead of containing only two (2) cones of varying size, include three (3) or more cones each having a different size. An example of such a pattern of cones is described in the Exhibits A and B.

As shown further in FIGS. 2A-I, metatarsal guard 30 may be anatomically contoured to conform to the shape of the foot. In particular, bottom surface 34 of guard 30, which may be situated against the foot during use, may be concavely shaped in the medial-lateral direction 44, and convexly shaped in the longitudinal direction 42. Thus, bottom surface 34 of guard 30 may conform to the metatarsal region of a user's foot.

In use, metatarsal guard 30 may be positioned within a shoe, similar to shoe 10 shown in FIG. 1, and may act to protect the metatarsal area of a user's foot. Thus, metatarsal guard 30 may be utilized as an internal guard in shoe 10 to protect a user's foot from falling objects or other impact events, which would otherwise injure the foot.

Other configurations of guard 30 are also contemplated. For instance, in the embodiment shown in FIGS. 2A-I, the pattern of cones 36 on top surface 32 of guard 30 may, in some instances, form a cross-shape or region 46. Alternatively, such guard 30 may have a top surface 32 without a pattern of cones formed thereon (not shown). Thus, top surface 32 of guard 30 may be relatively smooth or non-patterned. In this and other embodiments, instead of a cross-shape 46 being defined by the pattern of cones 36 on top surface 32 of guard 30, a cross-shaped recess (not shown) may be formed in guard 30.

Referring now to FIGS. 3A-I, an additional component, which is usable with internal metatarsal guard 30 (FIGS. 2A-I), is shown. The use and construction of this added component is set forth below.

As shown in FIGS. 3A-I, an added protective layer 60 may have inner 62 and outer 64 surfaces, and may be configured in a generally cross-type shape. The protective layer 60 may also be anatomically contoured to conform to the metatarsal region of the foot, similar to guard 30. Thus, inner surface 62 of protective layer 60 may be convexly shaped in a longitudinal direction 66 and concavely shaped in a medial-lateral direction 68. In a particular embodiment, inner surface 62 of protective layer 60 may also be adapted to abut top surface 32 of guard 30, such that protective layer 60 may overly guard 30. To be exact, the cross-shape of protective layer 60, as shown in FIGS. 3B and 3E, may approximate the cross-shape 46 formed on top surface 32 of guard 30 produced via cones 38, 40. Protective layer 60 may thusly overly the cross-shape 46 on top surface 32 of guard 30 produced via cones 38, 40 and provide additional impact resistant in that area.

Figure 3J:
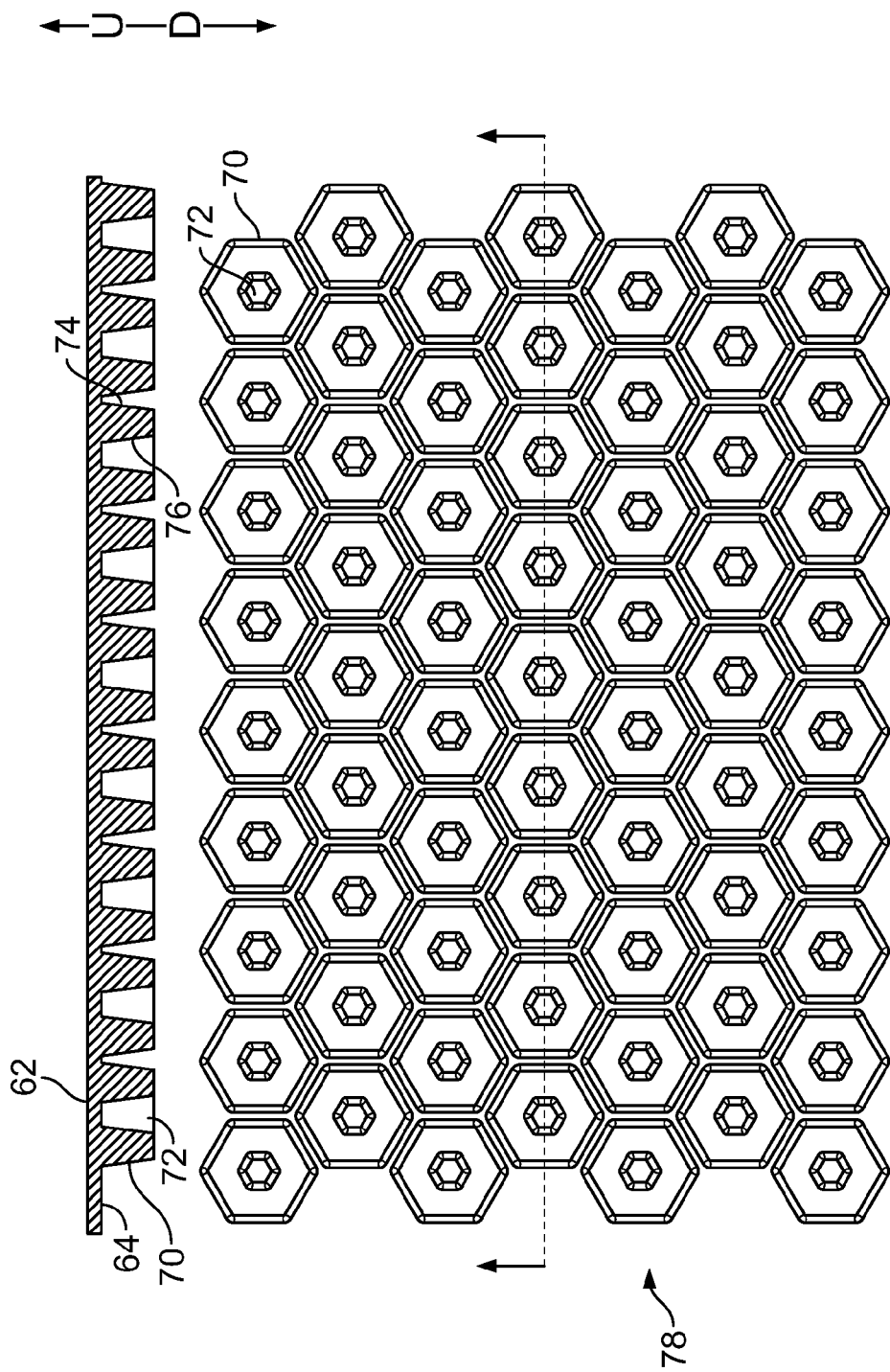
FIGS. 3A-I include top, bottom, medial, lateral, and section views of a protective layer usable with various embodiments of the present invention(s), with FIG. 3J showing the pattern of hexagons formed on the protective layer of FIGS. 3A-I.

FIGS. 3B, 3D, and particularly FIG. 3J depict, in detail, a hexagonal pattern 78 formed on outer surface 64 of protective layer 60. The pattern 78 may include a series of outer hexagons 70 into which a series of respective inner hexagons 72 are formed. In other words, individual outer hexagons 70 may be situated on outer surface 64 of protective layer 60 and, formed or bored into each such outer hexagon 70, may be an individual inner hexagon 72. As shown further in FIG. 3J, walls 74, 76 of outer and inner hexagons 70, 72, respectively, may also be angled in opposition to one another. In particular, while walls 74 of outer hexagons 70 are situated such that the width of the respective hexagon 70 increases as the walls 74 approach outer surface 64, walls 76 of inner hexagons 72 achieve an opposite effect (e.g., the width of each inner hexagon 72 decreases as walls 76 approach outer surface 64). The pattern 78 of outer 70 and inner 72 hexagons may also repeat along outer surface 64, as shown in FIG. 3J (e.g., successive outer and inner hexagons 70, 72 may be situated adjacent one another on outer surface 64).

The effect of the aforementioned pattern 78 of outer and inner hexagons 70, 72 may be to allow for flexion of protective layer 60 in one direction, while creating relative rigidity when protective layer 60 is bent in an opposing direction. For example, upon bending protective layer 60 outwards according to the downward facing arrow in FIG. 3J, the layer 60 may behave or react with flexibility, as the walls 74 of outer hexagons 70 may simply diverge from one another. However, upon bending protective layer 60 inwards according to the upwards facing arrow, the layer 60 may behave or react with rigidity, since adjacent walls 74 of outer hexagons 70 may converge on one another. This inward bending may also have an effect of increasing rigidity of protective layer 60 when impacted with an extraneous object (e.g., falling debris, a piece of lumber, etc.) In other words, with protective layer 60 bent inwards, walls 74 of outer hexagons 70 may abut one another and be somewhat pre-compressed, and walls 76 of inner hexagons 72 may provide a supporting structure, which resists further deflection of outer hexagons 70 (e.g., due to the opposing angle of walls 76). As a result, upon an extraneous object striking such protective layer 60 in the inwardly-bent orientation, the outer and inner hexagons 70, 72 may cooperate to provide rigidity and protect a user's foot from the brunt of the impact.

In some instances, the inwardly-bent state of protective layer 60 described above may be the state in which layer 60 is disposed during use. To be exact, since inner surface 62 of protective layer 60 may be convexly shaped in longitudinal direction 66 and concavely shaped in medial-lateral direction 68, protective layer 60 (or more specifically the hexagonal pattern 78 on outer surface 64 thereof) may be bent inwards, at least partially. Thus, protective layer 60 may be pre-disposed in a somewhat rigid state due to inward bending, the nature of which is detailed above. Such rigid state, however, may be sufficient to absorb the forces generated by an impact event. With inner surface 62 of protective layer 60 situated against a user's metatarsal region, protective layer 60 may therefore react with rigidity should an extraneous object strike the user's foot. Further, upon extension of the user's foot (e.g., during normal walking), protective layer 60 may react with flexibility since such layer 60 would bend outwards during this movement. The dynamic nature of the hexagonal pattern 78 of protective layer 60 may therefore serve to provide rigidity in instances where it is needed (e.g., upon impact with a potentially injuring object) and flexibility in others (e.g., during normal walking).

The above-described benefits of protective layer 60 may be incorporated into internal metatarsal guard 30 through either: (1) in one embodiment, connecting inner surface 62 of such layer 60 with top surface 32 of guard 30 as shown and described with respect to FIGS. 2A-I; or (2) situating protective layer 60, in an overlying relationship, on an internal metatarsal guard 30 having a smooth or non-patterned top surface 32. In other words, with respect to embodiment (2), protective layer 60 may be situated on a top surface 32 of guard 30 that does not have an alternating cone pattern 36 (e.g., such guard would have a relatively smooth or non-patterned surface). With respect to embodiment (1), protective layer 60 may be situated over the cross-shape pattern 46 produced via cones 38, 40 on top surface of guard 30. Accordingly, there are at least three (3) embodiments of internal metatarsal guard 30 contemplated by the present invention, such embodiments being: (1) the internal metatarsal guard 30 discussed with reference to FIGS. 2A-I; (2) embodiment (1) discussed above (i.e., internal metatarsal guard 30 of FIGS. 2A-I with an overlying protective layer 60); and (3) embodiment (2) detailed above (i.e., internal metatarsal guard 30 having a smooth or non-patterned top surface 32 and a protective layer 60 overlying such surface).

In use, each of the aforementioned embodiments (1) to (3) of internal metatarsal guard 30 may be situated between outer and inner layers of an upper of a shoe, such as shoe 10 of FIG. 1. Thus, much like the use of the internal metatarsal guard 18 discussed above, embodiments (1) to (3) of guard 30 may provide protection for the metatarsal region of a user's foot. However, such guard(s) 30 may also provide increased flexibility and improved rigidity. In particular, the impact forces potentially experienced during use of shoe 10 may be mitigated and absorbed via guard(s) 30.

A further embodiment metatarsal guard 90 is shown in FIGS. 4A-I. This guard 90, like guard(s) 30, may be anatomically contoured to a user's foot, in that a bottom surface 92 of the guard 90 may be convex in a longitudinal direction 96 and concave in a medial-lateral direction 98. It is also contemplated that metatarsal guard 90 may be situated between outer and inner layers of an upper of a shoe to provide protection against impact or other injuring events, and to absorb the forces generated by such events. Indeed, metatarsal guard 90, while usable by itself in some embodiments, is one component of the internal metatarsal guard 18 shown in shoe 10 of FIG. 1.

In a particular embodiment, a pattern of hexagons 100 may be situated on bottom surface 92 of metatarsal guard 90, such pattern 100 being identical to the pattern 78 shown and described with reference to FIGS. 3B, 3D, and particularly FIG. 3J. Thus, bottom surface 92 of guard 90 may provide protection for the metatarsal region of a user's foot in a similar way to protective layer 60. For example, it is contemplated that the pattern of hexagons 100 on bottom surface 92 of guard 90 may be inwardly-bent in the manner described in preceding sections, thereby adapting guard 90 to provide protection akin to protective layer 60. Stated differently, as metatarsal guard 90 may be inwardly-bent in its normal orientation, such guard 90 may react with relative rigidity if impacted with an extraneous object (e.g., the pattern of hexagons 100, and specifically the walls of each individual hexagon, may converge on one another once inwardly bent, and thereby provide a relatively rigid but absorptive surface with which to protect a user's metatarsal region). The rigid nature of hexagons 100 when situated in an inwardly-bent orientation is described in detail with respect to protective layer 60.

A variant of metatarsal guard 90 may include guard 90 with a protective layer 60, as shown and described with reference to FIGS. 3A-J, and FIG. 1. Such layer 60 may be situated in a cross-shaped recess 102 formed in guard 90, thereby positioning inner surface 62 of protective layer 60 against the user's foot, and outer surface 64 away from the foot. With protective layer 60 added as a component to metatarsal guard 90, such guard 90 may experience improved impact resistance and thereby provide even further protection for a user. In one embodiment, protective layer 60 may be cemented or otherwise adhered to cross-shaped recess 102 formed in guard 90, providing positive impact resistance in that area. Indeed, the above-described embodiment is shown in FIG. 1 as metatarsal guard 18 (i.e., metatarsal guard 18 comprises guard 90 with a protective layer 60 overlying such guard 90).

Figure 5:
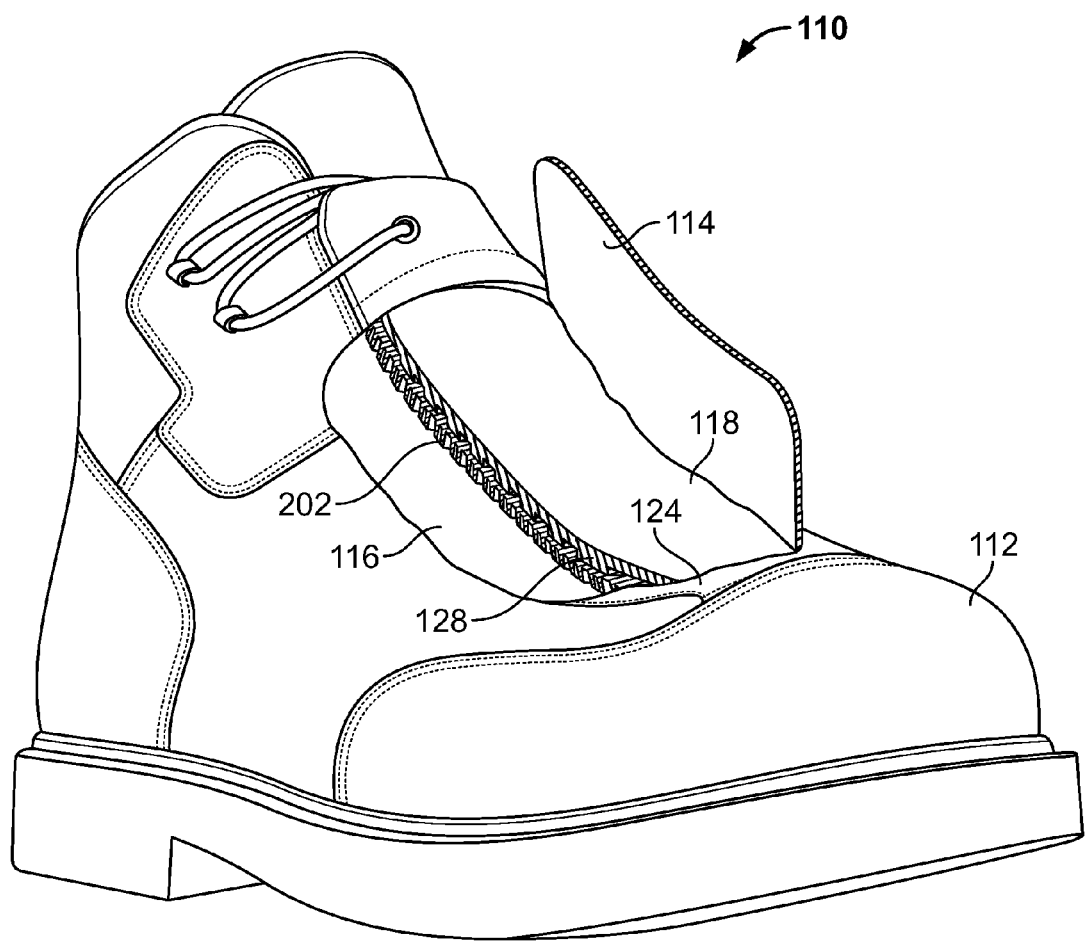
FIG. 5 is a side view of a shoe incorporating therein an external metatarsal guard according to an embodiment of the present invention.

FIG. 5 depicts a shoe 110 (similar to shoe 10), except that shoe 110 includes an external metatarsal guard 118 according to an embodiment of the invention. Such guard 118, in FIG. 5, is situated between outer 114 and inner 116 layers of a flap 124 connected to an upper 112 of the shoe 110. As shown, flap 124 may be situated over the metatarsal area of a user's foot to provide protection therefor. Guard 118 may generally include a foam or cushioning layer (described below) and an overlying rigid layer 128, the latter being shown in detail in FIGS. 6A-I and serving to provide resistance against impact forces experienced during normal use of shoe 110. External guard 118 may also conform (at least partially) to the anatomy of a user's foot in that such guard 118 may be convex in a longitudinal direction and concave in a medial-lateral direction.

FIGS. 7A-H depict an embodiment of one component 202 of external metatarsal guard 118, such component 202 being usable with shoe 110, as shown in FIG. 5. This flexible component 202 (FIGS. 7A-H) may include a top surface 192 and a bottom surface 194, the bottom surface 194 being relatively straight (or in some embodiments slightly convex) in a longitudinal direction 196, and concave in a medial-lateral direction 198. Further, bottom surface 194 may include a pattern of hexagons 200, such pattern 200 being identical to the patterns 78, 100 found on protective layer 60 (FIGS. 3A-J) and internal metatarsal guard 90 (FIGS. 4A-I), respectively. Thus, flexible component 202 of metatarsal guard 118 may offer the same or similar protective features as found with protective layer 60 and metatarsal guard 90.

In a particular embodiment, bottom surface 194 of flexible component 202 may be situated against a user's foot, thereby resulting in inward bending of the component 202 (or more specifically the pattern of hexagons 200). In other words, due to the concave curvature of bottom surface 194 of component 202 in the medial-lateral direction 198, such component 202 may be inwardly bent once situated against a user's foot. Flexible component 202 of guard 118, in this inwardly-bent state, may therefore offer the protective qualities noted above with respect to protective layer 60 and/or internal guard 90.

It is also contemplated that top surface 192 of flexible component 202 may be adhered or cemented to an overlying rigid layer 128, such as that shown in FIGS. 6A-I, to complete external metatarsal guard 118. This construct (external guard 118—or flexible component 202 with rigid layer 128) may also be situated within a flap 124 of a shoe, such as shoe 110 of FIG. 5. Indeed, flap 124 may contain a pocket for housing external guard 118. Such guard 118 may therefore serve to protect a user's foot from injury due to impact or other like events.

Referring now to FIGS. 8A-H, a component 232 of an alternate external metatarsal guard is shown, such guard also being usable within a shoe similar to shoe 110 of FIG. 5. The flexible component 232, in this embodiment, may include top 222 and bottom 224 surfaces that are curved in the same or a similar manner as surfaces 192, 194 of external guard 118. Thus, bottom surface 224 may be relatively straight (or convexly curved, in one embodiment) in a longitudinal direction 226, and concave in a medial-lateral direction 228. Further, top 222 and bottom 224 surfaces of component 232 may include a pattern of cones 230, such pattern 230 being identical to or sharing attributes with the pattern 36 of cones 38, 40 on internal metatarsal guard 30. Flexible component 232 may therefore offer the same or similar protective qualities as internal metatarsal guard 30, although being constructed for use in an external metatarsal guard.

As with external guard 118, flexible component 232 of FIGS. 8A-H, which acts as one component of the aforementioned external guard, may be cemented or otherwise adhered to rigid layer 128 of FIGS. 6A-I to complete the external guard. In particular, rigid layer 128 may be cemented or otherwise adhered to top surface 222 of flexible component 232 so as to provide increased impact resistance for the metatarsal region of a user's foot. This construct (the external guard—or flexible component 232 with rigid layer 128) may be situated within flap 124 of shoe 110 during use. To be exact, the external guard of the aforementioned embodiment may be situated within a pocket in flap 124. Accordingly, such external guard may be utilized in much the same manner as guard 118 for protection of a user's metatarsal region; and thus, such use is not explicitly detailed here.

In the devices depicted in the figures, particular structures are shown that are adapted for use in a shoe, such devices serving to protect the foot of a user of the shoe. The use of alternative structures for such purposes, including structures having different lengths, shapes, and configurations is also contemplated. As an example, other variants of an internal metatarsal guard beyond those discussed above are contemplated. For instance, it is contemplated that, in place of protective layer 60 in several embodiments, may be a non-patterned and cross-shaped rigid layer (not shown). In other words, a rigid layer of material may be provided, which is roughly the same shape as protective layer 60 (FIGS. 3A-J), but such layer may not include a pattern of hexagons thereon. This protective layer may, in some instances, be combined with an embodiment of internal metatarsal guard 30 shown in FIGS. 2A-J. In particular, the aforementioned cross-shaped rigid layer may be combined with an internal metatarsal guard 30 having a top surface 32 that is smooth or non-patterned, such top surface 32 further including a recess (not shown) to accommodate the rigid layer. To be exact, it is contemplated that the cross-shaped rigid layer may be disposed within the recess (not shown) in guard 30 to provide additional protection against impact or other injuring events in that area.

As another example, the aforementioned cross-shaped rigid layer may be used with internal metatarsal guard 90 shown in FIGS. 4A-I. Specifically, such cross-shaped rigid layer may be situated within cross-shaped recess 102 in internal metatarsal guard 90 and be cemented or otherwise adhered therein. Thus, the non-patterned rigid layer, in this embodiment, may provide increased protection for a user's foot during use.

Yet another embodiment may include substituting or replacing one of metatarsal guards 30, 90 with a non-patterned cushioning layer. Further, in these embodiments, the non-patterned cushioning layer may include, in a recess formed in the cushioning layer, a protective layer 60 according to FIGS. 3A-J. Protective layer 60, due to its cross-shape, may therefore be situated within a cross-shaped recess (not shown) formed in the non-patterned cushioning layer. Other configurations of internal and external metatarsal guards beyond those noted above are also contemplated.

While not explicitly detailed in preceding sections, it is also contemplated that the internal metatarsal guard(s) discussed above may be integrally attached with the upper 12 of shoe 10, or such guard(s) may be separable therefrom. The same is true for the external guard(s) detailed above (e.g., such guard(s) may be integrally attached to the internal pocket of flap 124 of shoe 110 or be separable therefrom). Thus, different internal and external metatarsal guards may be substituted for one another within shoes 10, 110, respectively, thereby allowing a user the choice of which guard to use. Alternatively, as noted above, the aforementioned guards may be integrally attached with shoes 10, 110, which would not allow a user to remove or substitute guards.

As another example, although the metatarsal protection devices detailed herein are predominantly convex in a longitudinal direction and concave in a medial-lateral direction, other curvatures and shapes are contemplated. Such alternate curvatures and/or shapes may also lend themselves to providing protection for other areas of a user's foot, or for other areas of the body. Indeed, it is contemplated that aspects of the aforementioned metatarsal protection devices may be utilized in other areas of a shoe to provide protection for other areas of a user's foot, such as, for example, in the heel or side of the shoe. If used for these purposes, the metatarsal protection devices disclosed herein may be modified in shape and contour to conform to the area of the foot being protected.

Likewise, it is contemplated that aspects of the aforementioned protection devices may be used to protect other areas of a user's body, such as, for example, the knee, elbow, etc. In particular, protective devices having the different layers of material and varying patterns discussed above may situated within a housing and be adapted to overly a surface of the user's body, such that the applicable device could protect the relevant portion of the body from injury. An example of this may be a knee or elbow guard, which utilizes at least one of the embodiments discussed above for protective purposes. In this manner, a user may be provided with several protective devices that are usable to shield varying portions of the body (e.g., including, but not limited to, the foot, knee, elbow, etc.)

Aspects of the present invention(s) may also be utilized in other areas beyond footwear protection. For instance, a protective device for a cell phone, computer, or other electronic device may be manufactured using several of the concepts detailed above. To be exact, an electronic device cover may be constructed using the above-noted technology, such cover including an inner surface or pocket for housing the device, and an outer surface for protecting the device from damage. In some embodiments, the electronic device cover may be composed of a foam or other material providing cushioning characteristics, and such foam or other material may include a pattern of cones or hexagons as hereinbefore described with reference to the figures.

For instance, in one embodiment, an inner surface of the electronic device cover may be relatively smooth, and an outer surface of the cover may have a pattern of cones or hexagons formed thereon to provide protection for the electronic device (e.g., from damage due to impact with another object, etc.) Alternatively, both the interior and exterior surfaces of the electronic device cover may include a pattern of cones or hexagons similar to that set forth above. In still another embodiment, it is contemplated that such pattern of cones or hexagons may only be formed on the interior of the cover, while the exterior may be relatively smooth. Thus, a number of combinations related to an electronic device cover are possible, the end result being a cover that protects the applicable device from damage via the various qualities of the cone and/or hexagon pattern formed on the cover. Such device cover, in some embodiments, may also conform generally to the shape of the device being protected (e.g., computer, iPod, cell phone, iPad, tablet, etc.)

Although aspects of the invention(s) herein have been described with reference to particular embodiments, it is to be understood that these embodiments are merely illustrative of aspects of the present invention(s). It is therefore to be understood that numerous modifications may be made to the illustrative embodiments and that other arrangements may be devised without departing from the spirit and scope of the present invention(s) as defined by the appended claims.

It will also be appreciated that the various dependent claims and the features set forth therein can be combined in different ways than presented in the initial claims. It will also be appreciated that the features described in connection with individual embodiments may be shared with others of the described embodiments.

The invention claimed is:
1. An article of apparel, comprising:
   a housing sized to retain a protection device, the housing being arranged adjacent a portion of a body of a user; and
   a protection device positioned within the housing, the protection device comprising:
      a first layer of material having first and second opposing surfaces and a series of frustum-shaped recesses formed along at least one of the first and second surfaces, wherein the series of frustum-shaped recesses includes a first frustum-shaped recess with a first depth and width and a second frustum-shaped recess with a second, different depth and width; and a second layer of material attached to the first layer and having a rigidity that is higher than a rigidity of the first layer, the first layer being shaped to conform to the portion of the user's body, such that the protection device is arranged to provide protection for the portion of the user's body against injurious events.

2. An article of apparel according to claim 1, wherein a first set of the first and second frustum-shaped recesses alternate along a lateral axis of the protection device, and a second set of the first and second frustum-shaped recesses alternate along a longitudinal axis of the protection device.

3. An article of apparel according to claim 1, wherein the first frustum-shaped recess is formed along the first surface of the first layer of material, and the second frustum-shaped recess is formed along the second surface of the first layer of material, the second frustum-shaped recess being inverted with respect to the first frustum-shaped recess.

4. An article of apparel according to claim 3, wherein the first and second frustum-shaped recesses are defined by a generally frustoconical region terminating in a circular end, and the circular end of the first frustum-shaped recess is adjacent the circular end of the second frustum-shaped recess.

5. An article of apparel according to claim 1, wherein each of the frustum-shaped recesses has a substantially continuous internal wall surface defining the frustum shape thereof.

6. An article of apparel according to claim 1, wherein the series of frustum-shaped recesses includes a pattern of hexagonal-shaped recesses.

7. An article of apparel according to claim 6, wherein each hexagonal-shaped recess comprises an inner hexagonal-shaped recess that is surrounded by an outer hexagon, the outer hexagon including walls extending alongside the inner hexagonal-shaped recess.

8. An article of apparel according to claim 1, wherein the second layer of material has first and second opposing surfaces and a series of frustum-shaped recesses are formed along at least one of the first and second surfaces.

9. An article of apparel according to claim 1, wherein the protection device is selected from the group consisting of a metatarsal guard for a shoe, a foot guard for protection of a portion of the user's foot, a knee guard, and an elbow guard.

10. An article of apparel according to claim 1, wherein the frustum-shaped recesses have a shape selected from the group consisting of a frustum of a cone and a hexagonal prism.

11. An article of apparel, comprising:
a housing sized to retain a protection device, the housing being arranged adjacent a portion of a body of a user; and
a protection device positioned within the housing, the protection device comprising first and second layers of material, the second layer of material being attached to the first layer of material and having a rigidity that is higher than a rigidity of the first layer, wherein the second layer of material includes first and second opposing surfaces, and a series of frustum-shaped recesses is formed along at least one of the first and second surfaces, the first layer of material being shaped to conform to a portion of a user's body to provide protection against injurious events.

12. An article of apparel according to claim 11, wherein each of the frustum-shaped recesses has a substantially continuous internal wall surface defining the frustum shape thereof.

13. An article of apparel according to claim 11, wherein the frustum-shaped recesses have a shape selected from the group consisting of a frustum of a cone and a hexagonal prism.

14. An article of apparel according to claim 11, wherein the first layer of material includes first and second opposing surfaces and a series of frustum-shaped recesses is formed along at least one of the first and second surfaces.

15. An article of apparel according to claim 14, wherein at least one of the series of frustum-shaped recesses formed along the first layer of material and the series of frustum-shaped recesses formed along the second layer of material includes a series of recesses in which each of the recesses is shaped as a hexagonal prism.

16. An article of apparel according to claim 11, wherein the second layer of material exhibits rigidity when bent in a first direction, and reacts with relative flexibility when bent in a second, opposing direction.

17. An article of apparel according to claim 11, wherein the frustum-shaped recesses are formed along the second surface of the second layer of material.

18. An article of apparel according to claim 11, wherein the protection device is selected from the group consisting of a metatarsal guard for a shoe, a foot guard for protection of a portion of the user's foot, a knee guard, and an elbow guard.

19. An article of apparel, comprising:
a protection device comprising first and second layers of material, the second layer of material being attached to the first layer of material and having a rigidity that is higher than a rigidity of the first layer, wherein the first and second layers of material each includes first and second opposing surfaces, respectively, and a series of frustum-shaped recesses is formed along at least one of the first and second surfaces of either the first or the second layer of material, wherein the series of frustum-shaped recesses includes a first frustum-shaped recess with a first depth and width and a second frustum-shaped recess with a second, different depth and width, the first layer of material being shaped to conform to a portion of a user's body to provide protection against injurious events.

20. An article of apparel according to claim 19, further comprising a housing sized to retain the protection device, the housing being arranged adjacent a portion of a body of the user, wherein the protection device is positioned within the housing.

21. An article of apparel according to claim 19, wherein the protection device is selected from the group consisting of a metatarsal guard for a shoe, a foot guard for protection of a portion of the user's foot, a knee guard, and an elbow guard.

22. An article of apparel according to claim 19, wherein each of the frustum-shaped recesses has a substantially continuous internal wall surface defining the frustum shape thereof.

23. An article of apparel according to claim 19, wherein each of the first and second layers of material includes a series of frustum-shaped recesses formed along at least one of the first and second opposing surfaces thereof.

* * * * *